Patented June 23, 1942

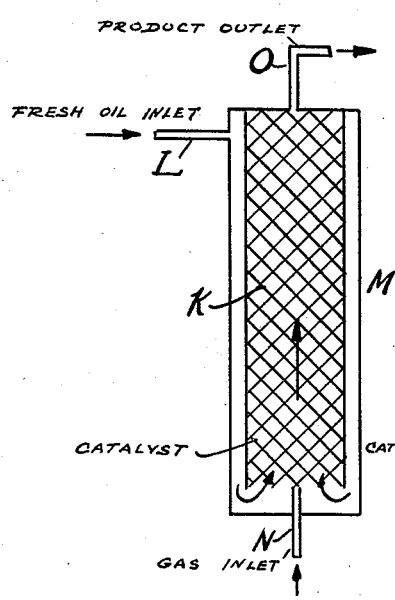
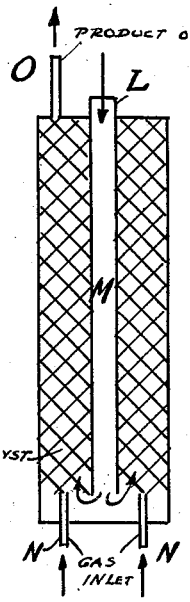
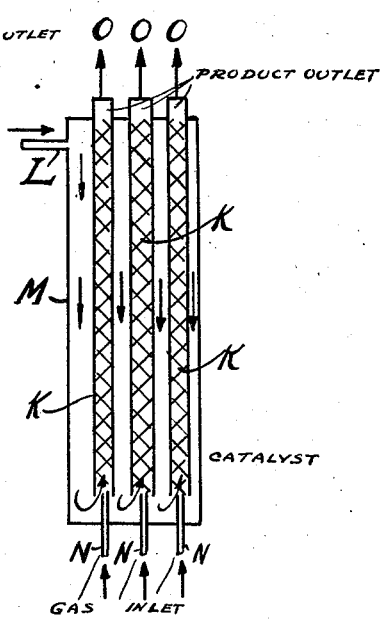
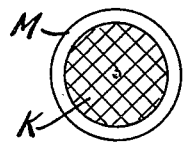
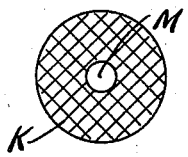
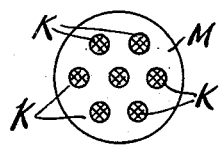

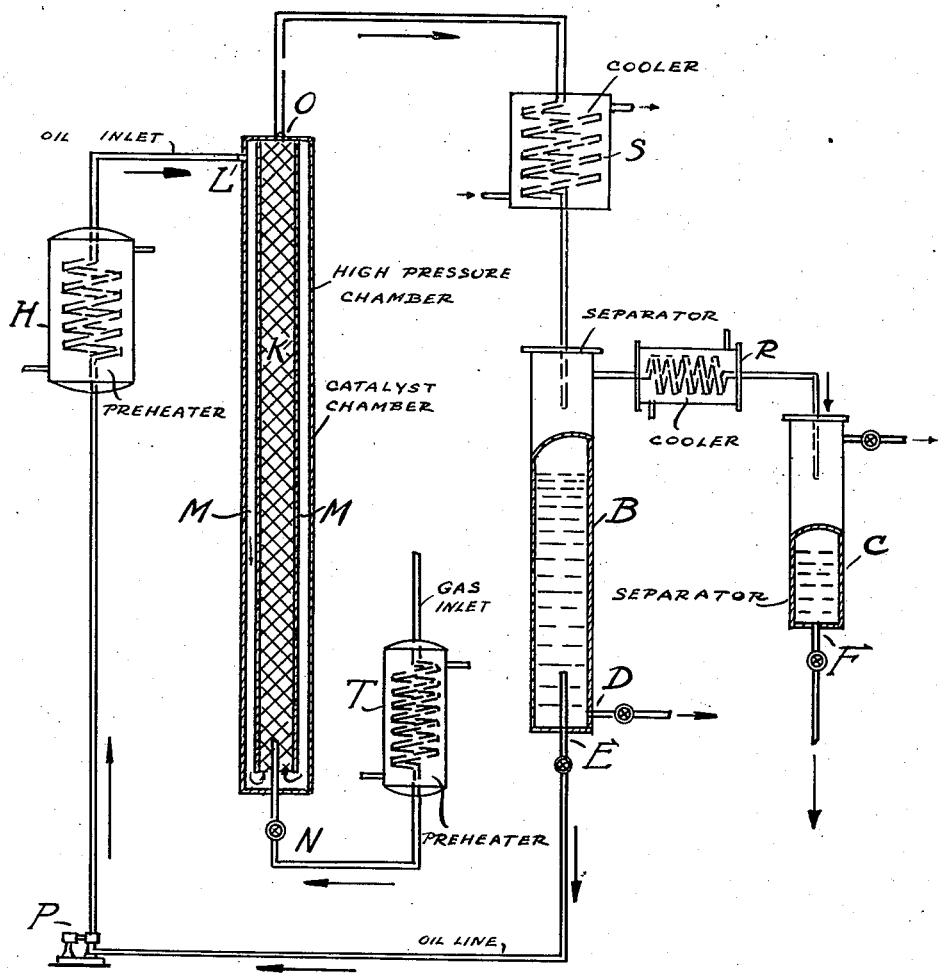

2,287,092

UNITED STATES PATENT OFFICE 2,287,092

SYNTHESIS OF HYDROCARBONS

Franz Duftschmid, Heidelberg, and Eduard Linckh and Fritz Winkler, Ludwigshafen-on-the-Rhine, Germany, assignors to Standard Catalytic Company, a corporation of Delaware Application May 20, 1939, Serial No. 274,736
In Germany May 27, 1938

4 Claims. (Cl. 260—449)

The present invention relates to the synthesis of hydrocarbons containing more than one carbon atom in the molecule from carbon monoxide and hydrogen.

It has already been proposed to lead away the heat evolved in the reaction of carbon monoxide with hydrogen to form hydrocarbons having more than one carbon atom in the molecule by means of a liquid medium in which the reaction is carried out. Such liquid medium may be obtained in a previous run of the reaction itself (so called proper oil). Advantageously a proper oil containing considerable amounts of constituents which are gaseous or vaporous under the temperature and pressure conditions prevailing in the reaction is used. These constituents are in particular those boiling in the boiling range of benzine or even lower, as, for example, down to 30° or 40° C.

The liquid medium may be led in the same direction as the synthesis gases or in counter-current thereto. When carrying out the process on a large industrial scale, working in counter-current offers the difficulty that especially when using a liquid medium having low-boiling constituents for example a proper oil of this type, the large amount of hot gases flowing through the liquid medium readily carries these low boiling constituents away from the reaction vessel so that the latter are not available for the reaction in the desired amount; the reaction proceeds much more slowly in the remaining higher-boiling fractions so that the yield per unit of space and time of the desired products is considerably diminished.

If the liquid medium be led in the same direction as the synthesis gases, the low-boiling constituents are carried away to a considerably smaller extent. In this case the maintenance of a uniform temperature over the whole length of the reaction chamber is, however, rendered difficult, because by reason of the exothermic nature of the reaction the products become increasingly hotter during their passage through the catalyst chamber so that towards the end of the reaction vessel the lower-boiling constituents are vaporized to an undesirably large extent without it being possible to bring them back into the reaction vessel, for example, by reflux cooling, against the strong current of the gases.

We have now found that the said reaction in the presence of a liquid medium, in particular an oil, which contains considerable amounts of constituents which are gaseous or vaporous under the temperature and pressure conditions prevailing in the reaction, can be carried out in a very advantageous manner by first passing the liquid medium along the catalyst chamber in indirect heat-exchange relation with the reaction participants contained in said catalyst chamber and then passing it through the catalyst chamber in the same direction as the reaction participants. Preferably, the liquid medium is passed along the reaction chamber in counter-current to the reaction participants contained in the said chamber, so that while the liquid medium is at its lowest temperature, it comes into contact with the hottest part of the catalyst chamber and thus keeps the temperature of this chamber much more uniform. An excessive rise in temperature at the end of the catalyst chamber is thus avoided and consequently the above-mentioned drawback of a too strong vaporisation of part of the liquid medium towards the end of the catalyst chamber is considerably mitigated or entirely avoided.

In order to be able to pass the liquid medium first along the catalyst chamber, the catalyst is arranged in one or more separate spaces, so-called cells. These catalyst cells may be of different shapes, as, for example, tubular, annular or pocket-shaped. The catalyst is introduced into the cells in a suitable form, as, for example, in pieces, the cells being bathed by the liquid medium, which is preferably preheated to a suitable temperature, before it enters the cells. The temperature of the liquid medium supplied to the reaction chamber is generally regulated so that after heat-exchange with the catalyst cells it has about the temperature at which the reaction takes place. The liquid medium or a part thereof may, however, also be branched off after the heat-exchange and subjected to a preheating before introduction into the catalyst cells.

The liquid medium is preferably a product of the reaction itself, namely an oil obtained from carbon monoxide and hydrogen in an earlier run of the synthesis (so called proper oil).

The nature of the invention will be further described with reference to the accompanying drawings in which are shown diagrammatically a number of apparatus in which the process according to this invention may be carried out, but the invention is not restricted to the particular apparatus shown.

In the said drawings K indicates the catalyst cells, M conduits for the introduction of liquid medium in indirect heat-exchange relationship with the content of said cells, N the means for introducing synthesis gas and O means for removing reaction products from the cell.

Figures 1 and 1a show a longitudinal and a cross section of a reaction vessel in which the catalyst cell is constructed as a single cylinder K through which the synthesis gas, which is introduced from below at N, is passed together with oil passed along the catalyst cell in indirect heat-exchange relationship therewith through the intermediate space M. Fresh oil is supplied at L. The reaction products together with the accompanying oil are withdrawn at O.

Figures 2 and 2a show an apparatus in which the catalyst is situated in an annular cell K. The liquid medium flows through conduit M in the centre of the vessel. As regards the supply of gas and withdrawal of the products, the arrangement is similar to that in Figures 1 and 1a.

According to Figures 3 and 3a the catalyst is situated in a number of separate tubular cells along which the liquid medium flows.

Figure 4 shows a complete plant for carrying out the said process and is described in greater details hereafter in the example.

The synthesis gas may also be admixed to the liquid medium before this is introduced into the apparatus. In case the gas is directly introduced into the catalyst chamber, it is preferably preheated in some way.

The temperature and pressure conditions as also the catalysts are those usual for the said reaction; it is preferable to work at temperatures between 170° and 420° C. and at pressures of more than 2 atmospheres, as for example 20 to 700 atmospheres or more, say 70 to 200 or 300 atmospheres. Lower pressures down to atmospheric or sometimes below may, however, also be used. The relative proportions of the initial gases may be varied within wide limits; the ratio of the amounts of carbon monoxide to hydrogen usually lies between about 4:1 and 1:4 (measured volumetrically), say between about 2:1 to 1:3, for example about 1:1 to 1:2. It is often advantageous to work with an excess of carbon monoxide. Diluent gases, such as carbon dioxide, nitrogen and/or methane may also be present. The liquid medium is usually added in an amount of about 0.5 to 5 parts by volume to 100 parts by volume of initial gases (measured at ordinary pressure and room temperature).

As the final products of the reaction there are obtained mainly liquid hydrocarbons, in addition to gaseous and solid hydrocarbons contingently with some products containing oxygen. The amount of the single products (benzine, middle oil, lubricating oil, paraffin wax) in the total product varies according to the reaction conditions used.

The following example, given with reference to Figure 4, will further illustrate how the present invention may be carried out in practice, but it should be understood that the invention is not limited to the said example.

Example

A is a high pressure chamber, 5.8 meters high and 200 millimeters in internal diameter in which is arranged a tube of 150 millimeters internal diameter which is open at the bottom, the arrangement being such that between the outer tube and the inserted tube there is an annular space M.

The initial gas, preheated in a gas preheater T to about 240° C., is led in under a pressure of 120 atmospheres through a supply pipe N which projects into the interior of the inserted tube. The circulating oil which is a product formed by the reaction in a previous run is pumped by a circulating pump P from a separator B into a preheater H and after being heated therein to 260° C. enters at L into the annular space M, in which it flows downwards until at the bottom it enters the catalyst chamber K.

During each hour there are supplied 83.3 cubic meters of gas having the composition:

|  | Per cent |
|---|---|
| $CO_2$ | 5.8 |
| $C_nH_{2n}$ | 0.7 |
| $CO$ | 42.6 |
| $H_2$ | 42.0 |
| $C_nH_{2n+2}$ | 3.9 |
| $N_2$ | 5.0 | and about 0.75 cubic meter of oil.

A fairly uniform temperature of from 275° to 285° C. is maintained over practically the whole length of the catalyst chamber by working in the said manner; this temperature may be maintained by suitable regulation of the amount of oil circulated and the degree of the preheating of the gas and oil. The inner space of the inserted tube is filled with pieces of from 8 to 10 millimeters in size of a catalyst obtained by fusing or sintering iron powder with small additions of titanium oxide, manganous oxide and potassium hydroxide in a current of oxygen and treatment for 48 hours with hydrogen at 650° C.

By one passage through the catalyst chamber, about 56 per cent of the carbon monoxide and hydrogen introduced enter into reaction.

The circulating oil, the residual gas and the products formed leave the chamber at O, pass through a cooler S and enter the separator B at a temperature of from 70° to 80° C. The major portion of the water formed separates with the oil in the separator B. Of the oil separated, the following amounts in per cent by volume boil at the temperatures given:

| Up to 150° C | 24.0 |
|---|---|
| From 150° to 300° C | 48.0 |
| Above 300° C | 28.0 |

The excess of oil formed and the water (which contains a small amount of compounds containing oxygen formed, such as methyl alcohol, ethyl alcohol and higher alcohols, dissolved therein) are removed at D. The remaining oil is withdrawn at E and returned through the oil circulating pump. The gases not condensed in the cooler S flow through another cooler R and separate further amounts of light benzine formed in a separator C; these are removed at F. A further residue of low-boiling benzine hydrocarbons formed is separated from the gas (at G) by oil washing. The final gas, obtained in an amount of 49.2 cubic meters per hour, has the following composition:

|  | Per cent |
|---|---|
| $CO_2$ | 19.2 |
| $C_nH_{2n}$ | 2.6 |
| $CO$ | 32.4 |
| $H_2$ | 30.5 |
| $C_nH_{2n+2}$ | 7.3 |
| $N_2$ | 8.0 |

It is recycled to the reaction chamber after separating the carbon dioxide and methane and admixture of fresh carbon monoxide and hydrogen.

The yields per hour are as follows:

| | Kilograms |
|---|---|
| Benzine and oil | 3.9 |
| Paraffin waxes | 0.9 |
| Alcohols | 0.3 |
| Hydrocarbons having more than one carbon atom in the molecule and boiling below the boiling range of benzine, such as propane, butane, ethylene, propylene and butylene | 1.2 |

What we claim is:

1. A process for the catalytic conversion of carbon monoxide and hydrogen into hydrocarbons containing more than one carbon atom in the molecule while contained in a hydrocarbon oil which comprises passing the said hydrocarbon oil along the catalyst chamber in indirect heat exchange relation with the reaction participants introduced into and passing through the catalyst chamber, and thereupon passing the said oil through the catalyst chamber in the same direction as the reaction participants.

2. In the process according to claim 1 passing the hydrocarbon oil along the catalyst chamber in counter-current to the reaction participants contained in the said catalyst chamber.

3. A process as claimed in claim 1, in which a hydrocarbon oil is employed which contains considerable amounts of constituents which are gaseous or vaporous under the temperature and pressure conditions prevailing in the reaction.

4. A process as claimed in claim 1, in which the hydrocarbon oil is a product formed in the reaction in a previous run.

FRANZ DUFTSCHMID.
EDUARD LINCKH.
FRITZ WINKLER.